United States Patent [19]

Loose

[11] 4,328,933
[45] May 11, 1982

[54] BELT CLAMPING RETRACTOR

[75] Inventor: Richard D. Loose, Birmingham, Mich.

[73] Assignee: General Motors Corporation, Detroit, Mich.

[21] Appl. No.: 191,284

[22] Filed: Sep. 26, 1980

[51] Int. Cl.³ .................. A62B 35/02; B65H 75/48
[52] U.S. Cl. ...................... 242/107.2; 242/107.4 A
[58] Field of Search .......... 242/107.2, 107.3, 107.4 R, 242/107.4 E, 156.1; 280/801–808; 297/474–480

[56] References Cited

U.S. PATENT DOCUMENTS

| 384,187 | 6/1888 | Blackman | 242/107.3 |
|---|---|---|---|
| 3,384,415 | 5/1968 | Monroe | 242/107.4 B X |
| 3,471,100 | 10/1969 | Arcari | 242/107.4 B |
| 3,480,228 | 11/1969 | Ulert | 242/107.4 |
| 3,482,798 | 12/1969 | Kawaguchi | 242/107.3 |
| 3,942,740 | 3/1976 | Torphammar et al. | 242/107.4 B |
| 4,120,466 | 10/1978 | Adomeit | 242/107.2 |
| 4,211,377 | 7/1980 | Yasumatsu | 242/107.2 |
| 4,273,301 | 6/1981 | Frankila | 242/107.2 |

FOREIGN PATENT DOCUMENTS 1531356 11/1978 United Kingdom .

*Primary Examiner*—John M. Jillions
*Attorney, Agent, or Firm*—Charles E. Leahy

[57] ABSTRACT

A seat belt retractor includes a belt reel rotated in the belt winding direction by a winding spring. An inertia actuated reel locking device acts to selectively lock the reel against belt unwinding rotation so that a load imposed on the belt during restraint of an occupant tends to tighten or spool down the wound-up belt stored on the reel. A belt clamp mechanism for limiting the extension of belt from the reel subsequent to reel lockup includes a lever pivotally mounted on the housing and having a belt clamping surface at one end thereof overlying the belt wound-up on the reel. A spring urges the lever to a normal position in which the belt clamping surface is spaced from the wound-up belt. The belt passes around a belt roller at the other end of the lever so that the imposition of occupant restraint load on the belt simultaneous with lockup of the reel by the inertia locking means forcibly pivots the lever to carry the belt clamping surface into clamping engagement of the belt wound upon the reel and thereby prevent belt from spooling off the reel.

1 Claim, 2 Drawing Figures

BELT CLAMPING RETRACTOR

This invention relates to a seat belt retractor having a belt reel selectively locked against belt unwinding rotation and more particularly provides an associated mechanism for clamping the belt to prevent spool-out of the belt wound upon the reel.

BACKGROUND OF THE INVENTION

It is well known to provide a passive seat belt system wherein one end of the belt is mounted inboard the seat and the outboard belt end is mounted on the door. A retractor is provided at one of the belt ends so that the belt is automatically wound and unwound between restraining and non-restraining positions by the swinging movement of the door. It is characteristic of such a passive belt system that many layers of belt are wound upon the retractor reel when the door is closed and the belt is in the restraining position. It has been observed in the prior art that the imposition of an occupant restraint load upon the belt subsequent to locking of the reel by a vehicle sensitive inertia locking mechanism causes the belt to tighten or spool-down on the reel and thereby extend the effective length of the restraint belt.

U.S. Pat. No. 4,120,466, issued Oct. 17, 1978 to Adomeit, discloses a self-actuating belt clamping device in which the belt is guided around the end of a lever so that imposition of an occupant restraint load on the belt pivots the lever to clamp the belt between a locking surface carried on the lever and a locking surface mounted on a fixed housing.

SUMMARY OF THE INVENTION

According to the present invention a seat belt retractor includes a belt reel rotatably mounted on a housing for belt winding and unwinding rotation. A winding spring rotates the reel in the belt winding direction. Locking means acts between the housing and the reel to selectively lock the reel against belt unwinding rotation so that a load imposed on the belt during restraint of an occupant tends to tighten or spool-down the wound-up belt on the reel. A belt clamp mechanism for limiting the extension of belt from the reel includes a lever pivotally mounted on the housing and having a belt clamping surface at one end thereof overlying the belt wound upon the reel. A spring acting between the lever and the housing establishes the lever in a normal pivotal position in which the belt clamping surface is spaced from the wound-up belt. The belt passes around a belt roller at the other end of the lever. The imposition of occupant restraint load on the belt concomitant with lockup of the reel by the inertia locking means exerts an effort on the belt roller causing the lever to pivot about the pivot means and carry the belt clamping surface into clamping engagement with the belt wound on the reel; thereby preventing belt from spooling down on the reel.

The object, feature and advantage of the invention resides in a reel locking seat belt retractor having an associated mechanism for clamping the belt on the reel to prevent belt from spooling off the reel subsequent to lockup of the reel.

Another object, feature and advantage of the invention resides in the provision of a lever pivoted to the retractor housing and having the belt passing therearound so that the imposition of occupant restraint load on the belt forcibly pivots the lever to move a belt clamping surface carried by lever radially toward the axis of reel rotation to clamp the belt on the reel and thereby prevent unspooling of the belt from the reel.

DESCRIPTION OF THE DRAWINGS

These and other objects, features and advantages of the invention will become apparent upon consideration of the specification and the drawings in which.

DESCRIPTION OF THE PREFERRED EMBODIMENT

Figure 1:
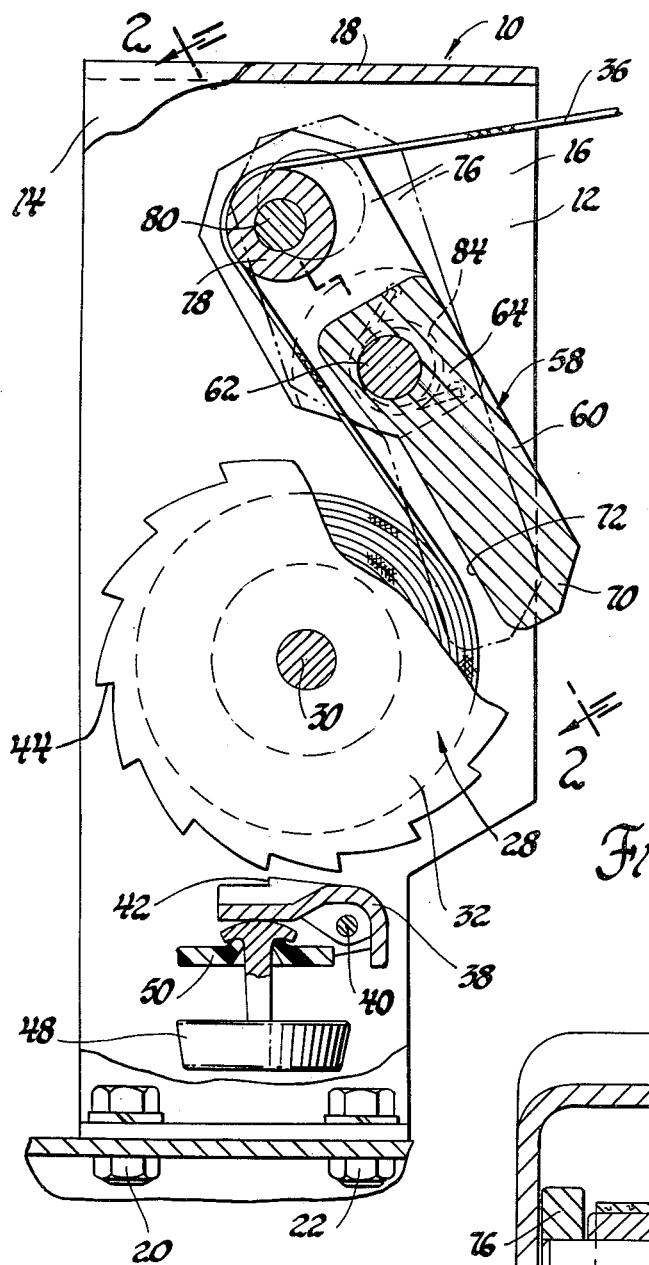
FIG. 1 is a side elevation view of a seat belt retractor having a belt clamping mechanism shown in the unclamping condition permitting normal belt winding and unwinding and showing the belt clamping condition in phantom line.
Figure 2:
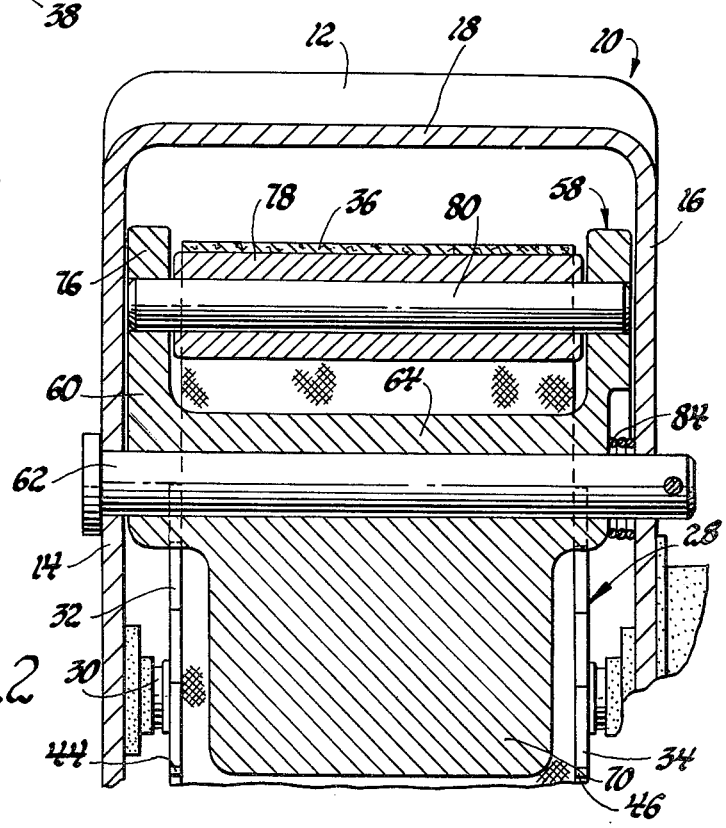
FIG. 2 is a sectional view taken in the direction of arrows 2—2 of FIG. 1.

Referring to FIGS. 1 and 2, a seat belt retractor is generally indicated at 10 and includes a housing 12 having spaced apart side walls 14 and 16. The side walls 14 and 16 are connected together in spaced relation by an integral crossbar 18 and are suitably attached to a fixed structure of a vehicle body by bolt and nut assemblies 20 and 22.

A belt reel, generally designated 28, includes a reel shaft 30 which extends through aligned apertures of the side walls 14 and 16 and has ratchet plates 32 and 34 attached thereto. The end of a restraint belt 36 is attached to the reel shaft 30 intermediate the ratchet plates 32 and 34. A spiral spring, not shown, has one end attached to the housing 12 and the other end suitably attached to the reel shaft 30 to rotate the belt reel 28 in the clockwise belt winding direction of rotation as viewed in FIG. 1.

A locking mechanism associated with the belt reel 28 includes a lock bar 38 which is pivotally mounted on the housing 12 by a shaft 40 which extends between the side walls 14 and 16. The lock bar 38 has a normal position shown in FIG. 1 in which a ratchet tooth 42 of the lock bar is spaced away from engagement with ratchet teeth 44 and 46 provided respectively on the ratchet plates 32 and 34. A pendulum 48 is mounted on the retractor housing by pendulum support 50 and is tilted from its normal vertical position of FIG. 1 by a vehicle deceleration condition of predetermined magnitude. The lock bar 38 rests upon the pendulum 48 so that tilting of the pendulum pivots the lock bar 38 to engage the ratchet tooth 42 thereof with the ratchet teeth 44 and 46 of the reel 28 to thereby lock the belt reel 28 against rotation in the belt unwinding direction.

A belt clamping mechanism generally designated 58 includes a lever 60 which is pivotally mounted on the housing 12 by a pivot shaft 62 which extends through aligned apertures of the housing side walls 14 and 16 and through the central body portion 64 of the lever 60. The lever 60 includes a belt clamping portion 70 having a belt clamping surface 72 which overlies the belt 36 wound upon the reel. The lateral extent of the belt clamping portion 70 is less than the lateral spacing between the ratchet plates 32 and 34. The lever 60 also has a belt reaction portion 76 including a roller 78 which is mounted on the lever 60 by a shaft 80 which extends between aligned mounting apertures provided in the lever 60. The belt clamping mechanism 58 also includes a torsion spring 84 which acts between the housing side wall 16 and the lever 60 to urge the lever 60 to the normal solid line indicated position of FIG. 1 in which the belt clamping surface 72 is spaced radially away from the wound-up belt.

Referring to FIG. 1 it will be understood that the retractor is shown in the normal unlocked condition. The belt 36 extends from the reel 28, passes around the reaction roller 78 and exits the retractor. The end of the belt 36, not shown, is attached to the vehicle door. Extension of the belt 36 from the retractor during door opening movement is permitted by unwinding rotation of the reel 28 against the winding bias of the reel windup spring. The reaction roller 78 rotates around its shaft 80 as the belt passes therearound during belt winding and unwinding from the reel 28. The torsion spring 84 acting between the lever 60 and the housing side wall 16 exerts a greater counterclockwise effort upon the lever 60 than the clockwise acting belt effort so that the lever 60 remains in its solid line indicated position of FIG. 1 in which the belt clamping surface 72 remains poised above the belt wound upon the reel 28.

When the motor vehicle experiences a deceleration condition of predetermined magnitude, the pendulum 48 tilts and raises the lock bar 38 to engage its ratchet teeth 42 with the ratchet teeth 44 and 46 of the reel ratchet plates 32 and 34. The forward momentum of the seat occupant is restrained by the belt 36. The occupant restraint load imposed on the belt acts upon the reaction roller 78 and overcomes the torsion spring 84 to pivot the lever 60 to the phantom line indicated position of FIG. 1 in which the belt clamping surface 72 is moved radially inward to compress and clamp the wound-up belt upon the belt reel 28. The outermost winding of belt on the reel is directly contacted by the clamping surface 72 and the underlying windings of belt are compressed and frictionally clamped against one another so that the belt is prevented from tightening down on itself and spooling off the reel subsequent to lockup of the reel by the lock bar 38.

Upon cessation of the occupant load against the restraint belt 36 the torsion spring 84 returns the lever 60 to the solid line indicated position of FIG. 1, thereby disengaging the belt clamping surface 72 from contact with the wound-up belt. Accordingly, the belt 36 may be wound and unwound from the reel.

While the invention has been disclosed herein primarily in terms of the specific embodiment shown in the drawings, it is not intended to be limited thereto, but rather only to the extent set forth in the appended claims.

It will be understood that the clamping effectiveness of the belt clamping mechanism is dependent on the relative distances between the pivot shaft 62, the reaction roller 78 and the belt clamping surface 72. Furthermore, it will be understood that the clamping effectiveness may also be enhanced by the provision of a belt clamping surface 72 having an arcuate or cup-shaped configuration adapted to engage a particular circumferential extent of belt wound upon the reel. Furthermore, the surface finish of the belt clamping surface 72 may be knurled or otherwise roughened to effect the magnitude of gripping engagement with the belt wound upon the reel.

Thus, it is seen that the invention provides a new and improved seat belt retractor having a lever mechanism adapted to clamp the belt upon the reel to prevent the belt from spooling off the reel subsequent to lockup of the reel against belt unwinding rotation.

The embodiments of the invention in which an exclusive property or privilege is claimed are defined as follows:

1. A seat belt retractor comprising:
   a housing;
   a reel rotatably mounted on the housing and having the belt wound thereon;
   locking means actuable to lock the reel against belt unwinding rotation;
   a lever having a belt clamping surface at one end thereof, another end, and a central portion;
   pivot means mounting the lever central portion on the housing to permit radial clamping movement of the belt clamping surface toward the axis of reel rotation to clamp the belt on the reel;
   spring means acting between the lever and the housing to establish the lever at a normal position in which the belt clamping surface is spaced away from the belt wound upon the reel;
   a belt roller rotatably mounted on the other end of the lever and having the belt passing therearound whereby the imposition of occupant restraint load on the belt concomitant with lockup of the reel by the locking means forcibly pivots the lever so that the clamping surface frictionally engages the outermost winding of belt on the reel and compresses the underlying layers of wound-up belt against one another to prevent belt from spooling down and extending from the reel; and
   the relationship of the belt clamping surface relative the lever pivot means being such that the belt unwinding resultant force vector acting on the lever clamping surface tangentially of the outermost layer of belt wound upon the reel acts to impart a force moment acting about the lever pivot means in a direction to self-energize the lever in additive effort to the occupant restraint load acting on the belt roller.

* * * * *